(12) United States Patent  (10) Patent No.: US 7,328,944 B2
Hajduczyk  (45) Date of Patent: Feb. 12, 2008

(54) CONTOUR MOTORCYCLE SEAT

(76) Inventor: Jerzy Hajduczyk, 7710-5th Ave., Kenosha, WI (US) 53143

( * ) Notice: Subject to any disclaimer, the term of this patent is extended or adjusted under 35 U.S.C. 154(b) by 0 days.

(21) Appl. No.: 11/254,616

(22) Filed: Oct. 20, 2005

(65) Prior Publication Data

US 2006/0138822 A1   Jun. 29, 2006

Related U.S. Application Data

(63) Continuation-in-part of application No. 10/902,410, filed on Nov. 29, 2004, now abandoned.

(60) Provisional application No. 60/494,112, filed on Aug. 12, 2004.

(51) Int. Cl.
 *B62J 1/00* (2006.01)
(52) U.S. Cl. .............................. 297/195.12; 297/452.47
(58) Field of Classification Search ........... 297/195.12, 297/452.42, 452.47, 195.1, 452.46
See application file for complete search history.

(56) References Cited

U.S. PATENT DOCUMENTS

| 403,078 | A | 5/1889 | Swett |
| 594,451 | A | 11/1897 | Wheeler |
| 656,588 | A | 8/1900 | Starr |
| 5,353,734 | A * | 10/1994 | Tani ............................ 297/199 |
| 5,356,205 | A | 10/1994 | Calvert |
| 5,597,200 | A | 1/1997 | Gregory |
| 5,735,229 | A * | 4/1998 | House et al. ................ 114/363 |
| 6,322,139 | B1 | 11/2001 | Chuang |
| 6,371,233 | B2 * | 4/2002 | Ishii ..................... 297/195.1 X |
| 6,450,572 | B1 | 9/2002 | Kuipers |
| 6,629,728 | B2 | 10/2003 | Losio |
| 6,997,517 | B1 * | 2/2006 | Schrapp et al. ......... 297/452.42 |
| 2003/0025363 | A1 | 2/2003 | Gaggiola |

* cited by examiner

*Primary Examiner*—Anthony D. Barfield
(74) *Attorney, Agent, or Firm*—Lesavich High-Tech Law Group, P.C.; Stephen Lesavich

(57) ABSTRACT

A contoured motorcycle seat. The contoured motorcycle seat includes one or more depressions for a rider and/or passenger to help relieve genital, back and neck pain. It also includes one or more air channel vents that vent the one or more depressions to help prevent heat build up and one more drain holes to drain any liquids that may enter the depressions.

14 Claims, 3 Drawing Sheets

PERSPECTIVE VIEW

PERSPECTIVE VIEW

TOP VIEW

CONTOUR MOTORCYCLE SEAT

CROSS REFERENCES TO RELATED APPLICATIONS

This applications is a Continuation-In-Part (CIP) of U.S. application Ser. No. 10/902,410, filed Jul. 29, 2004 now abandoned, which claims priority to U.S. Provisional Patent Application 60/494,112, filed Aug. 12, 2004. The contents of the U.S. Provisional Patent 60/494,112, are incorporated by reference.

FIELD OF THE INVENTION

This invention relates to motorcycles. More specifically, it relates to a contoured motorcycle seat.

BACKGROUND OF THE INVENTION

There are millions of motorcycle riders in the United States. Many of these motorcycle riders take their motorcycles on long trips which require a rider and/or a passenger sit on a conventional motorcycle seat for many hours, sometimes eight or more hours at a time with a break. When a rider and/or a passenger sits on a motorcycle seat for such a long period of time, the rider and/or passenger may experience extreme fatigue and may also develop pain due to engine vibration, bump roads, etc.

There are several problems associated with conventional motorcycle seats. One problem is that the weight of a driver and/or a passenger, while seated, causes pressure to be exerted on the driver's/passenger's genital area. This causes significant discomfort, especially during long rides and can lead to temporary or permanent problems including nerve damage. Another problem is that conventional motorcycle seats pass vibrations to the motorcycle engine and the road surface through to the rider's genital area, buttocks, thighs, back and neck causing discomfort and fatigue.

Another problem is that conventional motorcycle seats do not provide adequate ventilation causing heat to build up and making the rider and/or passenger sweaty and further causes them to slide around on the seat. Such sliding is uncomfortable and may also cause safety problems.

There have been attempts to solve some of the problems associated with bicycle seats, but not for motorcycle seats. For example, U.S. Pat. No. 6,629,728. entitled "Support structure for a vehicle," that issued to Losio et al. teaches "a ventilated support structure for a vehicle, such as a bicycle, comprising an upper side having a seat surface which is supported on a rigid or semi-rigid frame on which is anchored elastically flexible padding there between. The support structure may further comprise an aperture in an anterior portion of the frame. The aperture may be oriented at least partly in a direction of forward travel of the vehicle. An air distribution channel is connected to the aperture and is also connected to a plurality of air discharge openings to ventilate the seat surface."

U.S. Pat. No. 6,450,572 entitled "total comfort bicycle saddle," that issued to Kuipers teaches "A total comfort bicycle saddle that is adapted to provide a rider with both a comfortable cushion surface as well as a firm support surface to enhance the rider's comfort and provide adequate support of the rider's weight. The bicycle saddle includes a relatively hard foam extending over a rigid base, a relatively soft foam extending over the relatively hard foam, and a region of gel located on top of the relatively soft foam. The relatively soft foam is adapted to provide a comfortable cushion surface for the seated rider. The relatively hard foam lying below the relatively soft foam is adapted to prevent the rider from sinking into the soft foam and engaging the rigid base. The gel on top of the relatively soft foam is adapted to undergo a change in shape in response to a seated rider shifting his position so as to evenly distribute the rider's weight over the top of the saddle."

U.S. Pat. No. 6,322,139, entitled "bicycle saddle with ventilation function" that issued to Chuang teaches "A bicycle saddle includes a recessed portion in an upper side thereof, the recessed portion including a bottom having at least one opening. At least one guide plate is mounted in the bicycle saddle and includes an inlet that faces a front of the bicycle saddle. The guide plate and the bottom of the recessed portion of the bicycle saddle together defining a channel that communicates the inlet with the opening of the recessed portion of the bicycle saddle. A side vent is defined in each lateral side of the bicycle saddle. Thus, ambient air enters the recessed portion via the opening in the recessed portion and the side vents of the bicycle saddle during cycling to thereby provide a ventilation effect."

U.S. Pat. No. 5,597,200, entitled "variable temperature seat," that issued to Gregory et al., teaches "a seating construction with a plurality of plenums into which is received temperature conditioned air. The air passes through the seat via a plurality of channels formed in the foam of the seat cushion. The air then migrates through a reticulated foam layer that is itself covered with an air permeable layer of material. The reticulated foam and stitching of the seat fabric facilitate diffusion of the air from the foam channel conduits. The air then convectively circulates against and near the occupant of the seat to facilitate climate control around the occupant.

U.S. Pat. No. 5,356,205 entitled "seat assembly with a defined flexure region, venting or support nodules," that issued to Calvert et al. teaches "A seat assembly having flexure members and ventilation is disclosed. An elongated aperture is cut into a base plate of the seat assembly and flexure members are formed in a support plate of the assembly which is mounted to the base plate. The flexure members deform into the aperture thus providing a rider with additional comfort due to the flexibility of the seat. A venting hole is provided throughout the seat assembly to aid in rider comfort. A forced air ventilation system forces air to flow throughout the seat assembly, thus giving the rider ample ventilation.

U.S. Patent Application No. 20030025363, entitled "Ventilated bicycle saddle," that was published by Gaggiola teaches, "the present invention is directed to a ventilated bicycle saddle which enables air to flow along the top surface of the saddle while the bicycle is in motion. Specifically, the saddle of the present invention has a seat surface on which a rider sits. The top of the seat surface has a vent recess. An air distribution channel is positioned underneath the seat surface. The air distribution channel is engaged with one or more discharge openings disposed within the vent recess so that while the bicycle moves forwardly, air flows through the air distribution channel, through the air discharge openings disposed within the vent recess and then through the rear portion of the seat surface.

However, none of these solutions solves all of the problems associated with motorcycle seats. Thus, it would be desirable to provide a motorcycle seat that overcomes these problems and others.

SUMMARY OF THE INVENTION

In accordance with preferred embodiments of the present invention, some of the problems associated with motorcycle seats are overcome. A contoured motorcycle seat is presented.

The contoured motorcycle seat includes one or more depressions to help relieve genital, back and neck pain. It also includes one or more air channel vents that vent the one or more contoured depressions to help prevent heat build up and one more drain holes to drain any liquids that may enter the contoured depressions.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

Figure 1:
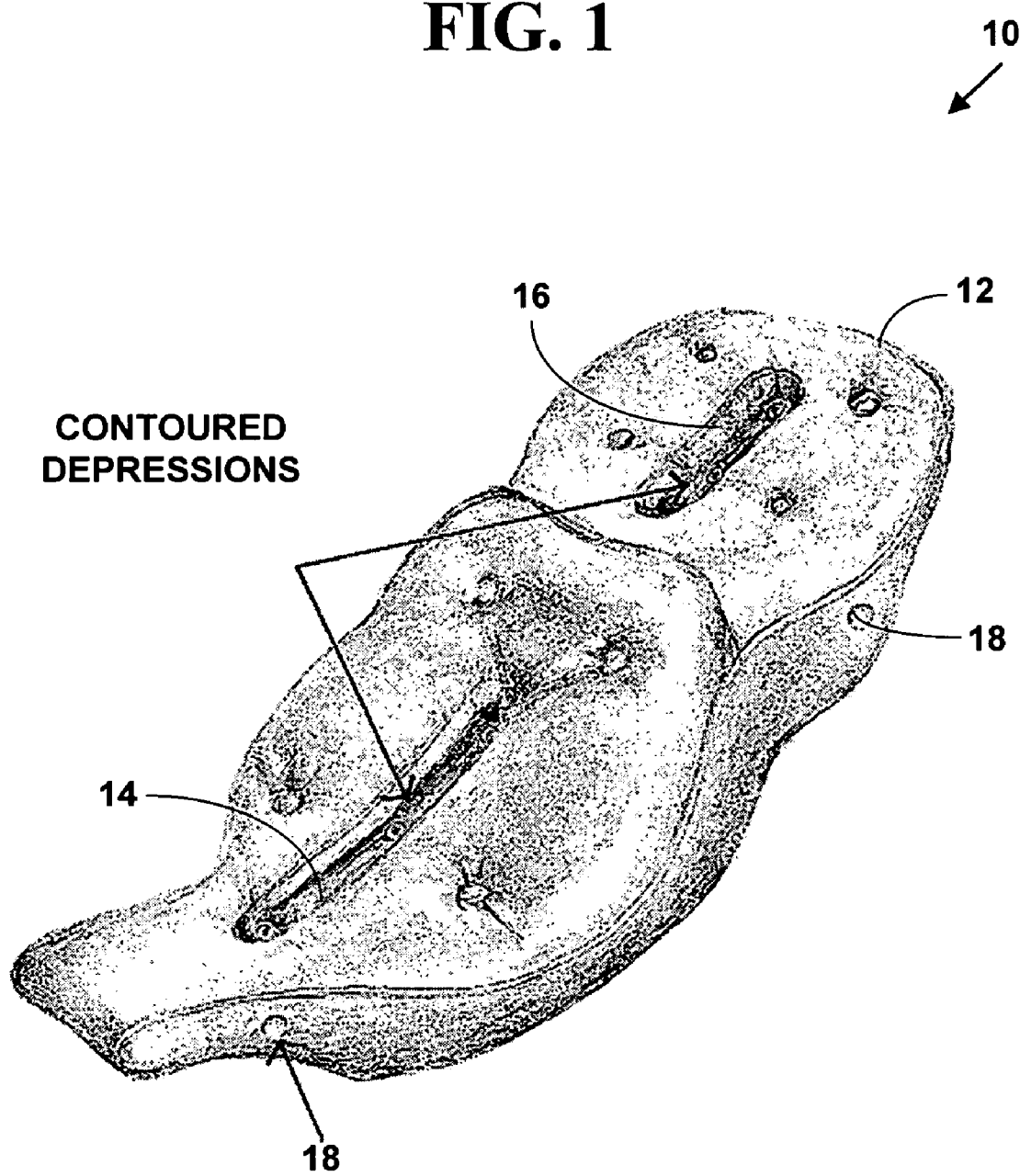
FIG. 1 is a block diagram illustrating a perspective view of a contoured motorcycle seat.

FIG. 1 is a block diagram illustrating a perspective view 10 of a contoured motorcycle seat 12. The contoured motorcycle seat 12 includes one or more contoured depressions 14, 16, typically one or more for a rider area and one or more for a passenger area. Only one contoured depression is illustrated for the rider and the passenger in FIG. 1. However, the present invention is not limited to one contoured depressions for the rider and passenger and more contoured depressions can also be used to practice the invention.

In one embodiment, a first contoured depression 14 for the rider includes a depression of about 2 inches in width, about 2.5 inches in depth and about 10 inches in length. In one embodiment, the second contoured depression 16 for the passenger includes a depression of about 2 inches in width 3 inches in depth and 8 inches in length. However, the present invention is not limited to depressions with these dimensions and other dimensions can also be used to practice the invention.

The contoured motorcycle seat 12 also includes one or more air channel vent inlets 18 on the left and right sides of the contoured motorcycled seat. The one or more air channel vents 18 connect the outside of the contoured motorcycle seat 12 directly to the contoured depressions 14, 16. The one or more air channel vent inlets 18 provide ventilation into the depressions 14, 16, helping to prevent heat from building up on the seat for the rider and/or passenger. The one or more air channel vent inlets 18 are placed so that the rider or passengers legs do not cover the one or more air channel inlets 18 when the rider or passenger sits on the contoured motorcycled seat.

Figure 2:
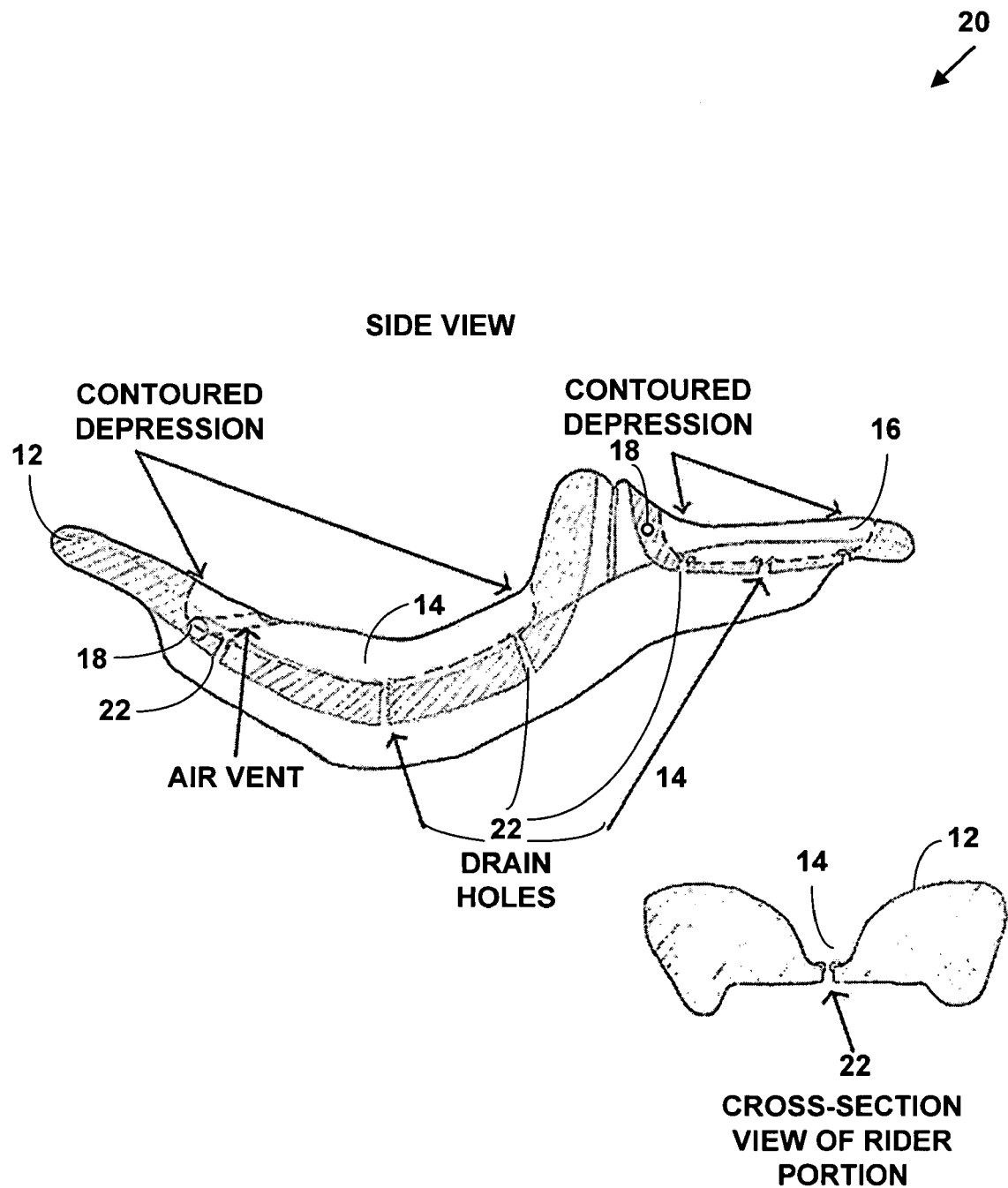
FIG. 2 is a block diagram illustrating a side view of a contoured motorcycle seat.

FIG. 2 is a block diagram illustrating a side view 20 of a contoured motorcycle seat 12. The contoured motorcycle seat 12 further includes one or more drain holes 22. The drain holes 22 allow any liquids such as rider or passenger sweat, rain water, beverages, etc. to be effectively drained from the contoured depressions 14, 16 in the contoured motorcycle seat 12 and off the motorcycle.

Figure 3:
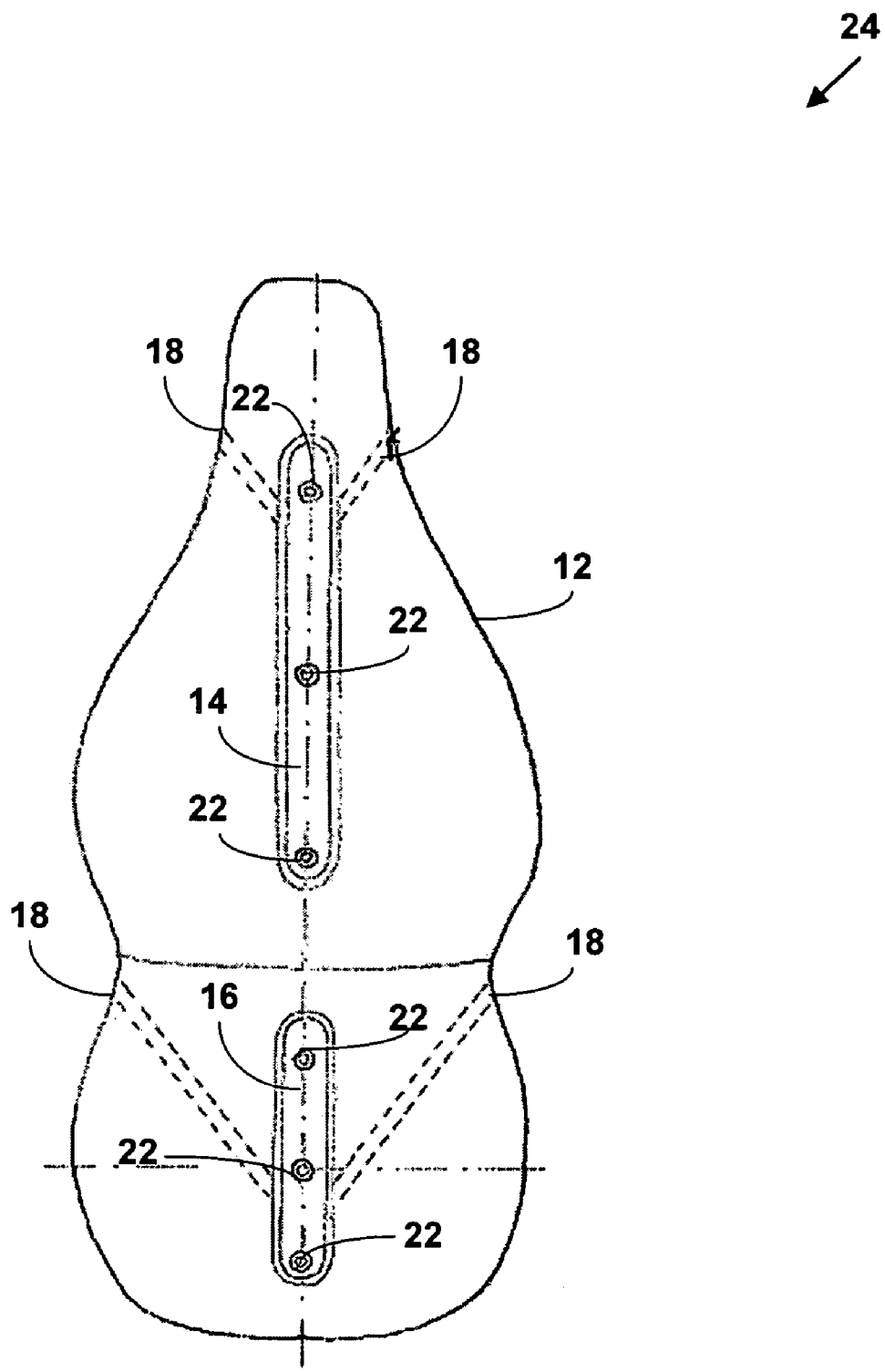
FIG. 3 is a block diagram illustrating a top view of a contoured motorcycle seat.

FIG. 3 is a block diagram illustrating a top view 24 of a contoured motorcycle seat 12. The top view 24 of the contoured motorcycle seat 12 illustrates the contoured depressions, 14, 16, the air channel vents 18 and the drain holes 22.

In another embodiment, the first contoured depression 14 is connected to the second contoured depression 16 via a channel to maximize airflow. In another embodiment, the one or more air channel vents 18 are connected to each other to maximize airflow through the first contoured depression 14 and the second contoured depression 16.

The countered motorcycle seat 12 in FIGS. 1-3 is illustrated as being a curved motorcycle seat with one level for a rider and another level for a passenger. However, the present invention is not limited to such an embodiment and other shapes and more or fewer levels can be used to practice the invention. In another embodiment, the motorcycle seat is flat. In such an embodiment, the motorcycle seat is flat and includes one level for both the rider and the passenger.

However the present invention is not limited the motorcycle seats illustrated or described other motorcycle seats of other sizes and shapes can be used to practice the invention.

It should be understood that the components described herein are not related or limited to any particular type of components unless indicated otherwise. Various types of general purpose or specialized components may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, more or fewer elements may be used in the block diagrams.

The claims should not be read as limited to any particular size, dimension or component unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A contoured saddle motorcycle seat, comprising in combination:

a first portion for seating a rider with a first contoured depression comprising an integral elongated groove within a top side thereof;

a second portion for seating a passenger with a second contoured depression comprising an integral elongated groove within a top side thereof;

one or more openings in a bottom of the first contoured depression and in a bottom the second contoured depression for draining liquids and for introducing air into the first contoured depression and the second contoured depression; and one or more openings in a left and right side of the first portion and the second portion for introducing air into the first contoured depression and the second contoured depression, and wherein one or more openings in a bottom of the first contoured depression and in a bottom of the second contoured depression include one or more drain holes that allow liquids to be drained from a top portion of the contoured saddle motorcycle seat onto a motorcycle to which the contoured saddle motorcycle seat is attached for dispersing off the motorcycle.

2. The contoured motorcycle seat of claim 1 wherein the first contoured depression includes a depression of about 2 inches in width, about 2.5 inches in depth and about 10 inches in length.

3. The contoured motorcycle seat of claim 1 wherein the second contoured depression includes a depression of about 2 inches in width 3 inches in depth and 8 inches in length.

4. The contoured motorcycle seat of claim 1 wherein one or more openings in a left and right side include in one or more channels that connect the one or more openings to the first contoured depression and the second contoured depression.

5. The contoured motorcycle seat of claim 1 wherein the first contoured depression is connected to the second contoured depression via a channel.

6. The contoured motorcycle seat of claim 1 wherein the one or more openings in a left and right side of the first portion and the second portion are connected.

7. The contoured motorcycle seat of claim 1 wherein the one or more openings in a left and right side of the first portion and the second portion are positioned so they are not covered by a leg of the rider or the passenger.

8. A contoured saddle motorcycle seat, comprising in combination:
   a means for seating a rider with a first contoured depression comprising an integral elongated groove within an upper side thereof;
   a means for seating a passenger with a second contoured depression comprising an integral elongated groove within an upper side thereof;
   means for draining liquids and for introducing air into the first contoured depression and the second contoured depression of the contoured motorcycle seat; and
   means for introducing air into the first contoured depression and the second contoured depression from a left side and a right side of the contoured motorcycle seat, and
   wherein the means for draining liquids and for introducing air into the first contoured depression and the second contoured depression include one or more drain holes that allow liquids to be drained from a top portion of the contoured saddle motorcycle seat onto a motorcycle to which the contoured saddle motorcycle seat is attached for dispersing off the motorcycle.

9. The contoured motorcycle seat of claim 8 wherein the means for introducing air into the first contoured depression and the second contoured depression are positioned so they are not covered by a leg of the rider or the passenger.

10. The contoured motorcycle seat of claim 8 wherein the means for introducing air into the first contoured depression and the second contoured depression are connected.

11. A contoured motorcycle seat, comprising in combination:
   a first portion for seating a rider with a first contoured depression in a top side thereof, wherein the first contoured depression includes a depression of about 2 inches in width, about 2.5 inches in depth and about 10 inches in length;
   a second portion for seating a passenger with a second contoured depression in a top side thereof;
   one or more openings in a bottom of the first contoured depression and in a bottom the second contoured depression for draining liquids and for introducing air into the first contoured depression and the second contoured depression; and
   one or more openings in a left and right side of the first portion and the second portion for introducing air into the first contoured depression and the second contoured depression.

12. A contoured motorcycle seat, comprising in combination:
   a first portion for seating a rider with a first contoured depression in a top side thereof;
   a second portion for seating a passenger with a second contoured depression in a top side thereof, wherein the second contoured depression includes a depression of about 2 inches in width 3 inches in depth and 8 inches in length;
   one or more openings in a bottom of the first contoured depression and in a bottom the second contoured depression for draining liquids and for introducing air into the first contoured depression and the second contoured depression; and
   one or more openings in a left and right side of the first portion and the second portion for introducing air into the first contoured depression and the second contoured depression.

13. A contoured motorcycle seat, comprising in combination:
   a first portion for seating a rider with a first contoured depression in a top side thereof;
   a second portion for seating a passenger with a second contoured depression in a top side thereof;
   one or more openings in a bottom of the first contoured depression and in a bottom the second contoured depression for draining liquids and for introducing air into the first contoured depression and the second contoured depression; and
   one or more openings in a left and right side of the first portion and the second portion for introducing air into the first contoured depression and the second contoured depression,
   wherein the one or more openings in the bottom of the first contoured depression and in the bottom of the second contoured depression include one or more drain holes that allow liquids to be drained from a top portion of the contoured motorcycle seat onto a motorcycle to which the contoured motorcycle seat is attached for dispersing off the motorcycle.

14. A contoured motorcycle seat, comprising in combination:
   a first portion for seating a rider with a first contoured depression in a top side thereof, wherein the first contoured depression includes a depression of about 2 inches in width, about 2.5 inches in depth and about 10 inches in length;
   a second portion for seating a passenger with a second contoured depression in a top side thereof, wherein the second contoured depression includes a depression of about 2 inches in width 3 inches in depth and 8 inches in length;
   one or more openings in a bottom of the first contoured depression and in a bottom the second contoured depression for draining liquids and for introducing air into the first contoured depression and the second contoured depression; and
   one or more openings in a left and right side of the first portion and the second portion for introducing air into the first contoured depression and the second contoured depression,
   wherein the one or more openings in the bottom of the first contoured depression and in the bottom of the second contoured depression include one or more drain holes that allow liquids to be drained from a top portion of the contoured motorcycle seat onto a motorcycle to which the contoured motorcycle seat is attached for dispersing off the motorcycle.

* * * * *